United States Patent
Zhang et al.

(10) Patent No.: US 12,474,294 B2
(45) Date of Patent: Nov. 18, 2025

(54) FIELD-EFFECT TRANSISTOR DEVICE OR SENSOR FOR SENSING IONS, MOLECULES OR BIOMARKERS IN A FLUID

(71) Applicant: ECOLE POLYTECHNIQUE FEDERALE DE LAUSANNE (EPFL), Lausanne (CH)

(72) Inventors: Junrui Zhang, Ecublens (CH); Francesco Bellando, Renens (CH); Erick Garcia Cordero, Lausanne (CH); Mihai Adrian Ionescu, Ecublens (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 725 days.

(21) Appl. No.: 17/254,556

(22) PCT Filed: Jun. 21, 2019

(86) PCT No.: PCT/IB2019/055238
§ 371 (c)(1),
(2) Date: Dec. 21, 2020

(87) PCT Pub. No.: WO2019/244113
PCT Pub. Date: Dec. 26, 2019

(65) Prior Publication Data
US 2021/0270770 A1    Sep. 2, 2021

Related U.S. Application Data

(60) Provisional application No. 62/688,413, filed on Jun. 22, 2018.

(51) Int. Cl.
*G01N 27/414* (2006.01)
*B01L 3/00* (2006.01)

(52) U.S. Cl.
CPC .... *G01N 27/4145* (2013.01); *B01L 3/502715* (2013.01); *B01L 3/50273* (2013.01);
(Continued)

(58) Field of Classification Search
CPC .......... G01N 27/4145; B01L 3/502715; B01L 3/50273; B01L 2300/0636; B01L 2400/0406; B82Y 15/00
See application file for complete search history.

(56) References Cited

U.S. PATENT DOCUMENTS

2010/0282617 A1* 11/2010 Rothberg .......... G01N 27/4148
205/780.5
2010/0300895 A1    12/2010 Nobile et al.
(Continued)

FOREIGN PATENT DOCUMENTS

CN   102484267 A    5/2012
WO   2010/138188 A1  12/2010
WO   2014/057289     4/2014

OTHER PUBLICATIONS

Bausells, J., et al., "Ion-sensitive field-effect transistors fabricated in a commercial CMOS technology," Sensors and Actuators B: Chemical, vol. 57, 1999, pp. 56-62.
(Continued)

*Primary Examiner* — Su C Kim
(74) *Attorney, Agent, or Firm* — NIXON & VANDERHYE

(57) ABSTRACT

The present disclosure concerns a Field-Effect Transistor device or sensor comprising at least one drain region, at least one source region, at least a channel region, at least a first gate connected to the channel region, at least one stack comprising at least one metal layer or metal extension and at least one via layer or via extension; or a plurality of alternating (i) metal layers or metal extensions and (ii) via layers or via extensions, at least one second gate or second
(Continued)

layer connected to the at least one first gate by the at least one stack, the at least one second gate or second layer permitting sensing of ions, and/or molecules and/or biomarkers, and at least one microfluidic channel or structure connected to or provided on the at least one second gate or second layer.

16 Claims, 11 Drawing Sheets

(52) U.S. Cl.
CPC .......... *B01L 2300/0636* (2013.01); *B01L 2400/0406* (2013.01)

(56) References Cited

U.S. PATENT DOCUMENTS

| | | | |
|---|---|---|---|
| 2013/0341734 A1* | 12/2013 | Merz | H01L 21/82 438/49 |
| 2014/0264322 A1 | 9/2014 | Fife | |
| 2014/0308752 A1 | 10/2014 | Chang et al. | |
| 2015/0064829 A1* | 3/2015 | Fife | G01N 27/4145 438/49 |
| 2015/0084099 A1 | 3/2015 | Shen et al. | |
| 2018/0070869 A1 | 3/2018 | Ionescu et al. | |

OTHER PUBLICATIONS

Bergveld, P., "Thirty years of ISFETOLOGY—What happened in the past 30 years and what may happen in the next 30 years," Sensors and Actuators B: Chemical, vol. 88, 2003, pp. 1-20.

Foster, D. J., "Silicon Processing: CMOS Technology," Electronic Materials, 1991, pp. 173-191.

Georgiou, Pantelis, et al., "ISFET characteristics in CMOS and their application to weak inversion operation," Sensors and Actuators B: Chemical, vol. 143, 2009, pp. 211-217.

Jamasb, Shahriar, "An Analytical Technique for Counteracting Drift in Ion-Selective Field Effect Transistors (ISFETs)," IEEE Sensors Journal, vol. 4, No. 6, Dec. 2004, pp. 795-801.

Shahrabi, Elmira, et al., "Chip-Level CMOS Co-Integration of ReRAM-Based Non-Volatile Memories," PRIME Conference, Jun. 2016, pp. 1-4.

First Office Action dated Dec. 9, 2022, issued in China Application No. 201980053300.7 and English translation, 34 pages.

International Search Report for PCT/IB2019/055238 mailed Sep. 27, 2019, 5 pages.

Written Opinion of the ISA for PCT/IB2019/055238 mailed Sep. 27, 2019, 7 pages.

1 Office Action, issued in European Patent Application No. 19748946.1 dated Mar. 27, 2023.

\* cited by examiner

FIELD-EFFECT TRANSISTOR DEVICE OR SENSOR FOR SENSING IONS, MOLECULES OR BIOMARKERS IN A FLUID

CROSS-REFERENCE TO RELATED APPLICATIONS

This application is the U.S. national phase of International Application No. PCT/IB2019/055238 filed on Jun. 21, 2019 which designated the U.S. and claims priority to US Provisional Patent Application No. 62/688,413 filed on Jun. 22, 2018 the entire contents of each of which are incorporated by reference.

FIELD OF THE INVENTION

The present invention concerns a Field-Effect Transistor (FET) device, or an ion, molecule or biomarker Field-Effect Transistor (FET) device or sensor. The present invention concerns in particular a Field-Effect Transistor (FET) device or Field-Effect Transistor (FET) sensor for sensing ions, molecules or biomarkers in a fluid.

BACKGROUND

Over the past few decades, Ion-Sensitive Field-Effect Transistors (ISFETs) have been fabricated using a variety of technologies [1] based on the idea of an ion-sensitive gate. In the effort to bring ISFETs into Point-of-Care applications and wearable products [2], their compatibility with industrial CMOS processes is of particular importance for realizing a miniaturized integrated sensor system.

The challenges are high, knowing that it is very difficult to change any processing steps in established CMOS Front-End-of-the-Line fabrication or processing.

Moreover, the majority of ISFETs fabricated in commercial CMOS processes and reported to date showed low sensitivity, linearity and stability, especially when using oxynitrides as sensing gate insulator [3].

SUMMARY OF THE INVENTION

The present disclosure addresses the above-mentioned limitations by providing a Field-Effect Transistor device or sensor for sensing ions, and/or molecules and/or biomarkers.

Other advantageous features can be found in the dependent claims.

Another aspect of the present disclosure concerns a Point-of-Care or wearable device including the above-mentioned FET device or sensor.

Yet another aspect of the present disclosure concerns a method for producing a FET device or sensor (1, 2, 101, 201) according to claims 44 and 54.

In the present disclosure, the Inventors report for the first time, to the best of their knowledge, a post-processed 0.18 µm commercial CMOS chip where the transducing transistor and the sensing gate electrode are vertically co-integrated, resulting in a 3D-Extended Metal Gate Field-Effect Transistor device or a 3D-Extended Metal Gate ISFET (3D-EMG-ISFET). It should be noted that this sensor was produced using an exemplary CMOS node and the present disclosure is not limited to this sole node and can be extended/generalized to any type of CMOS node.

In an exemplary embodiment in which the top electrode is made of Al with an $Al_2O_3$ native oxide connected to the transistor gate using vertical vias, a sensitivity of 56.8 mV/pH is achieved. In an exemplary embodiment, the proposed Field-Effect Transistor device or ISFET of the present disclosure is demonstrated as a full-scale pH sensor and can advantageously be fabricated in a non-modified commercial CMOS process.

The above and other objects, features and advantages of the present invention and the manner of realizing them will become more apparent, and the invention itself will best be understood from a study of the following description with reference to the attached drawings showing some preferred embodiments of the invention.

A BRIEF DESCRIPTION OF THE SEVERAL VIEWS OF THE DRAWINGS

Figure 4A:
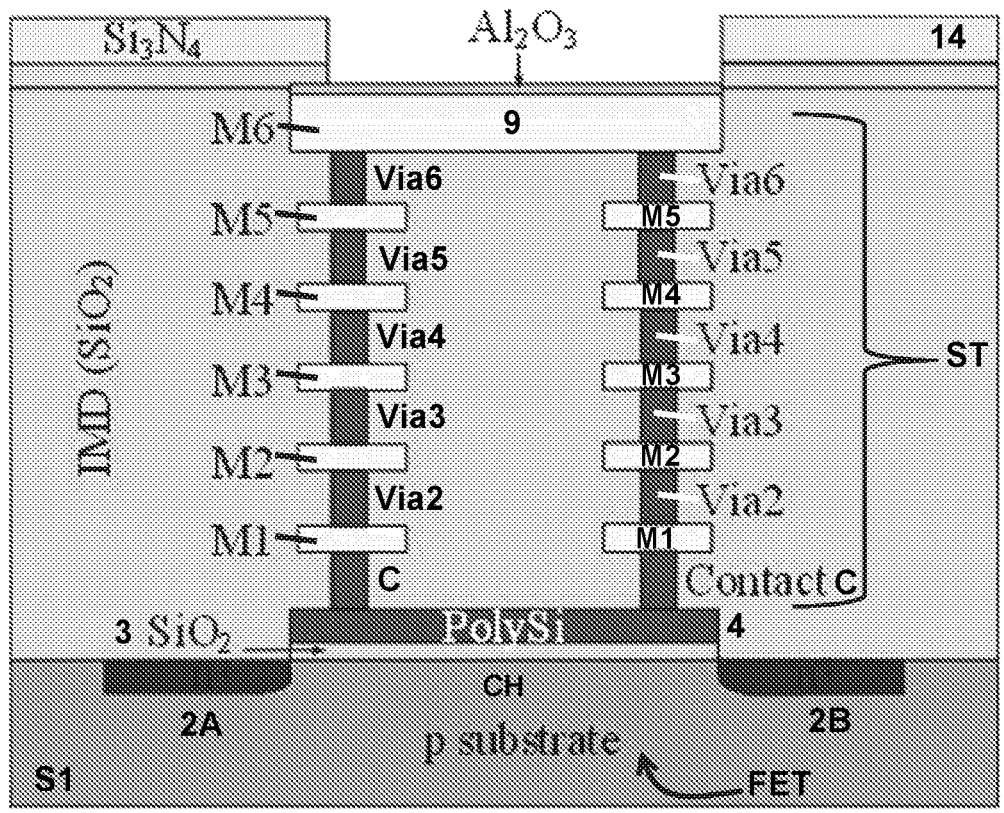
Figure 4B:
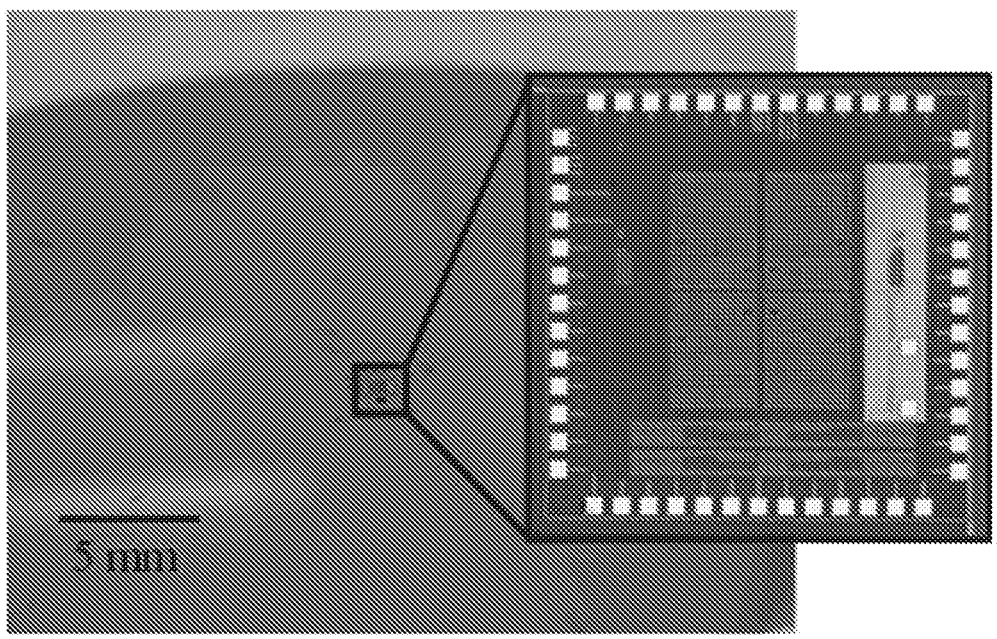

FIG. 4A shows a cross-sectional sketch of an exemplary Field-Effect Transistor (FET) device of the present disclosure fabricated in a 0.18 µm CMOS process. Gate length: 10 µm, width: 20 µm. FIG. 4B shows a Handle wafer for post-processing the chip in a clean room. Inset: Optical Image of chip in cavity.

FIG. 5A shows a schematic of photolithography openings depicted above a gate area of a Field-Effect Transistor (FET) device.

FIG. 5B shows a corresponding top view optical image of FIG. 5A revealing gate area openings.

FIG. 5C shows a schematic of reactive ion etching of dielectric layers to expose a top metal layer (for example, Al) and shows a natively formed $Al_2O_3$ layer that can be used for sensing purposes.

FIG. 5D shows a corresponding top view optical image of FIG. 5C.

FIG. 5E shows an exemplary sensing measurement setup or apparatus.

FIG. 5F is a photo of the setup or apparatus of FIG. 5E during a measurement in progress. A liquid-under-test (LUT) is contained in a reservoir with a PDMS lid being used to reduce evaporation.

Figure 5:
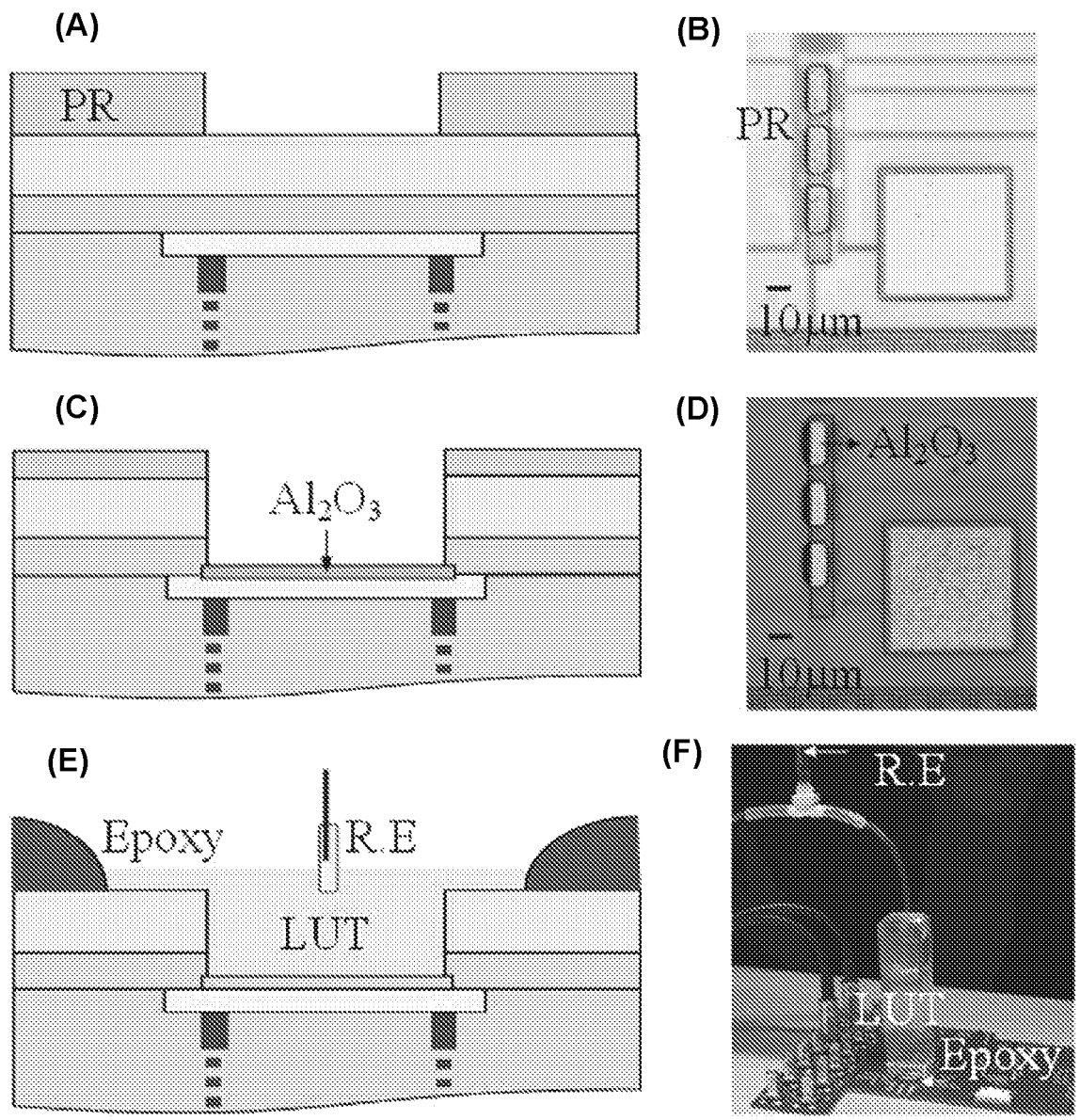
Figure 6A:
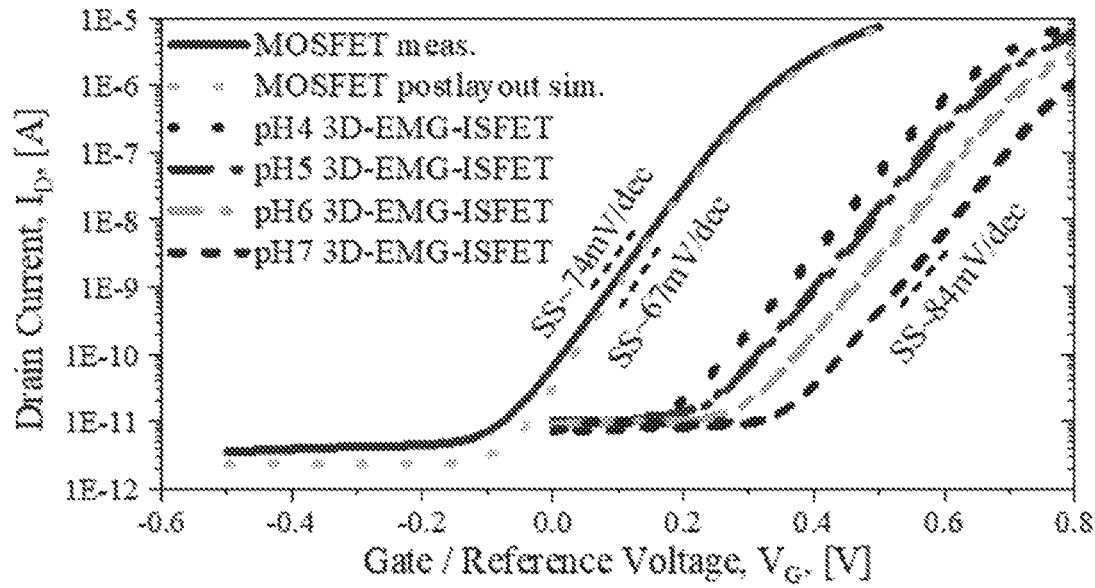

FIG. 6A shows $I_D$-$V_G$ characteristics of the Field-Effect Transistor (FET) device of FIG. 5 when $V_D$=0.1 V and $V_S$=0 V for the FET (measurement and post-layout simulation), and the 3D-EMG-ISFET in various pH buffers.

Figure 6B:
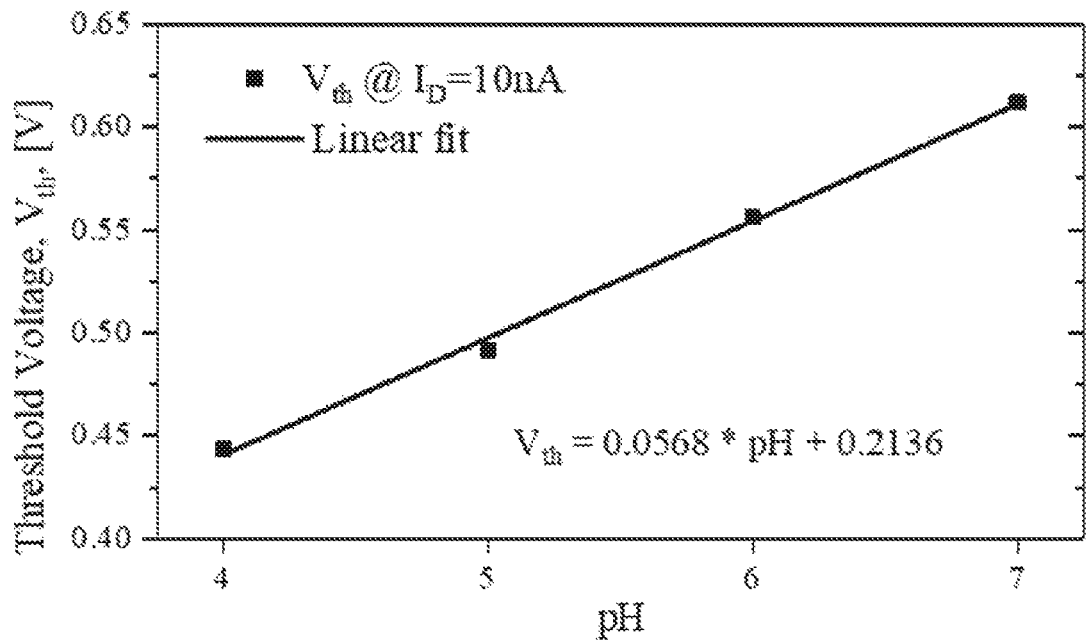

FIG. 6B shows $V_{th}$ change against varying pH. $V_{th}$ is derived from FIG. 5A for different pH buffers, at a constant $I_D$ of 10 nA.

Figure 6C:
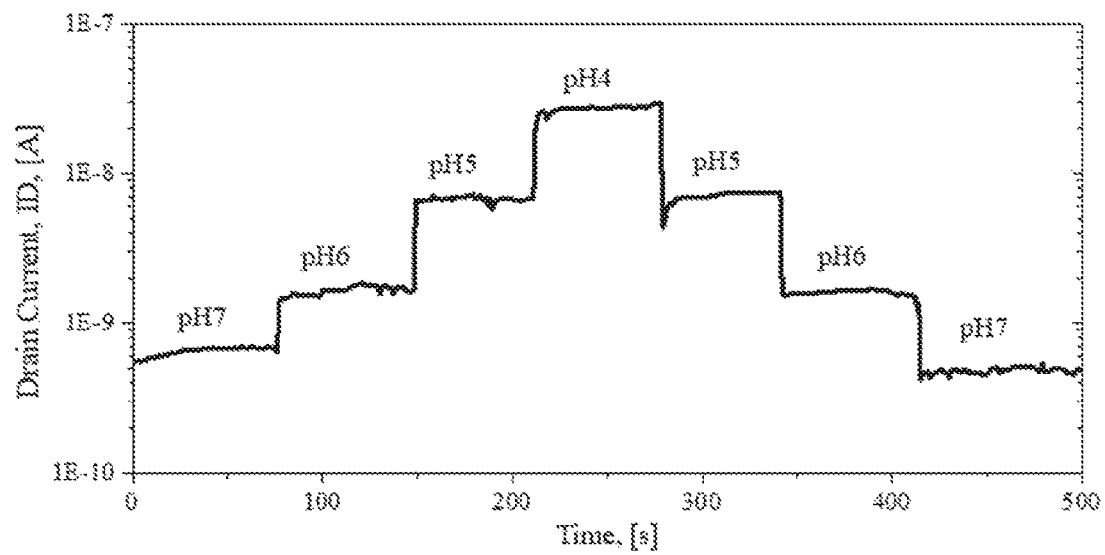

FIG. 6C shows the sensor's dynamic response in various buffer solutions from pH=4 to pH=7, when $V_D$=0.1V, $V_S$=0V, $V_G$=0.5V.

Figure 6D:
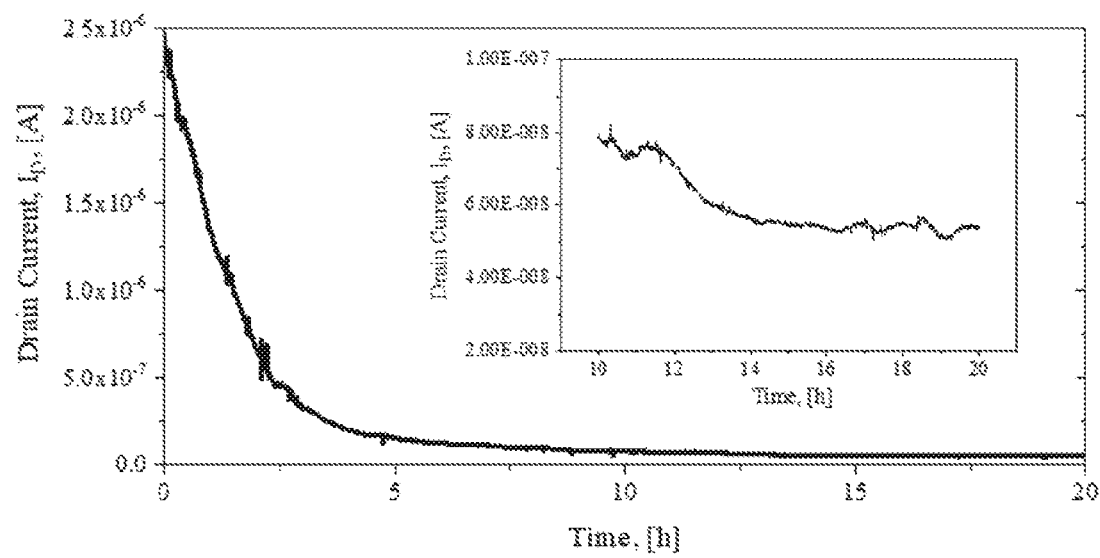

FIG. 6D shows long term drain current drift of the Field-Effect Transistor (FET) device at pH=4. Measurement is carried out at constant voltage bias: $V_{ref}$=0.3 V, $V_D$=0.1 V, $V_S$=0 V. ID is monitored for 20 hours. Inset: zoom in of the drift plot from $10^{th}$ hour to $20^{th}$ hour. The initial exponential drift is due to the hydration of the $Al_2O_3$ layer [5]. From the initial and final value of $I_D$ (2.45 μA and 53.7 nA, respectively), the threshold voltage drift over 20 hours can be calculated to be $\Delta V_{th}$~160 mV (using the $I_D$ $V_G$ curve of pH=4). The threshold voltage drift in the last ten hours, calculated with the same method, amounts to ~14.5 mV.

Figure 7A:
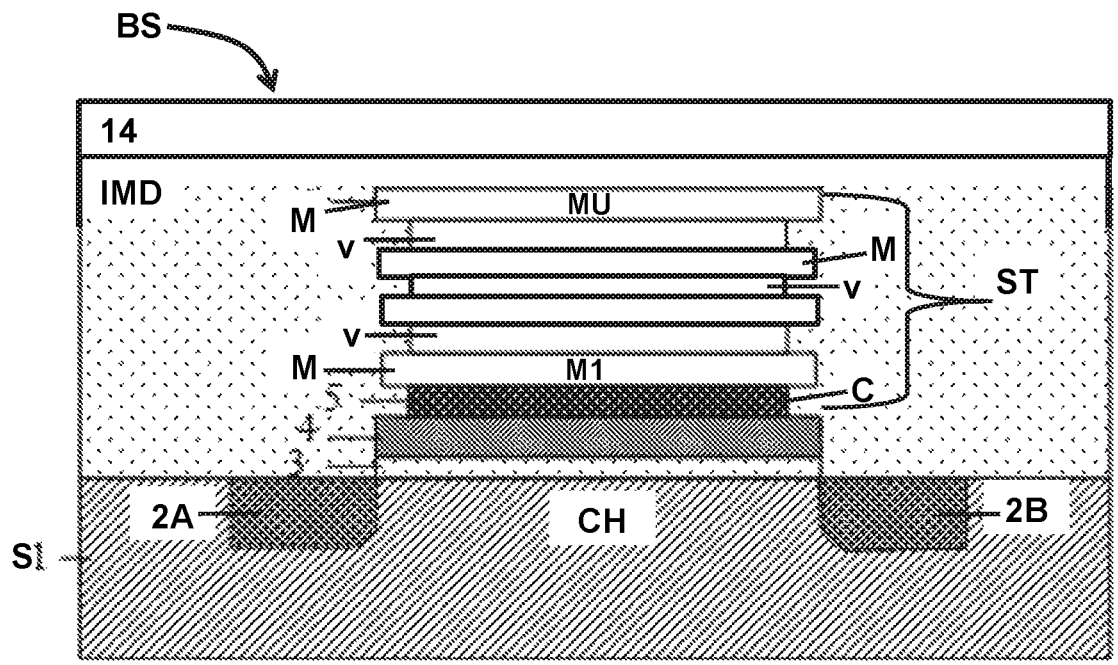
Figure 7B:
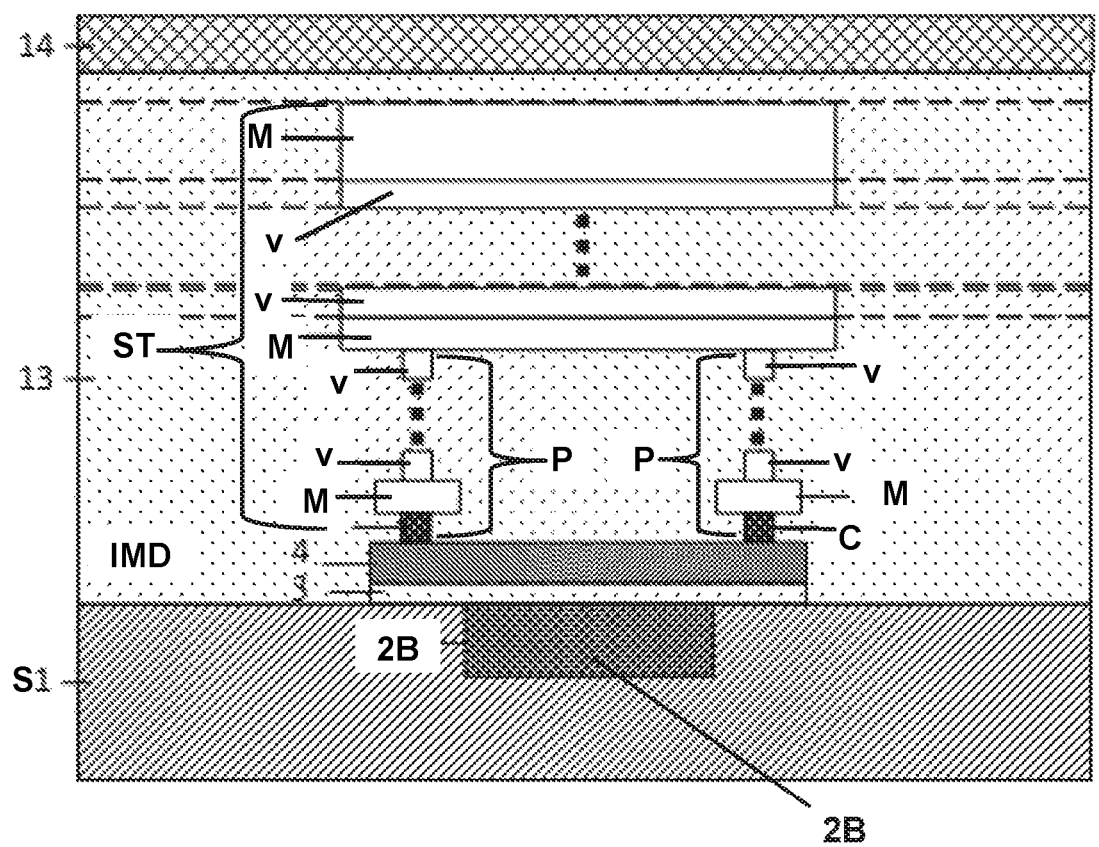

FIGS. 7A and 7B show exemplary basis or fabrication structures from which the Field-Effect Transistor (FET) device of the present disclosure can be fabricated.

Herein, identical reference numerals are used, where possible, to designate identical elements that are common to the Figures.

DETAILED DESCRIPTION OF SEVERAL EMBODIMENTS

Exemplary ion and/or biomarker Field-Effect Transistor (FET) devices or sensors 1 or ion, and/or molecule and/or biomarker Field-Effect Transistor (FET) devices or sensors 1, 2, 101, 201 of the present disclosure are shown in FIGS. 1 to 5.

Field-Effect Transistor (FET) devices or sensors 1, 2, 101, 201 of the present disclosure are, for example, for or configured for sensing analytes or chemical species having a physiological and non-physiological relevance or application. The analytes may, for example, have a net electrical charge or no net electrical charge.

Field-Effect Transistor (FET) devices or sensors 1, 2, 101, 201 of the present disclosure can be, for example, for or configured for sensing ions and/or biomarkers in a fluid or liquid. Additionally or alternatively, the Field-Effect Transistor (FET) devices or sensors 1, 2, 101, 201 of the present disclosure can be, for example, for or configured for sensing molecules. The molecules may have a net electrical charge or no net electrical charge.

For example, analytes such ions, and/or molecules, and/or hormones, and/or proteins, and/or enzymes and/or DNA/RNA having a physiological and non-physiological relevance or application can be sensed, captured or detected. Ions include, for example, molecules having a net electrical charge.

The FET device or sensor 1, 2, 101, 201 can be produced or fabricated from a basis structure or fabrication structure BS such as that shown in FIG. 7A or 7B. The basis structure BS can be fabricated from a standard commercial CMOS node. More details can be found for example in reference [6].

The structure BS comprises at least one semiconductor substrate or bulk layer S1 (for example, a planar substrate), at least one semiconductor drain region 2A, at least one semiconductor source region 2B, a semiconductor channel region CH (for example, an intrinsic channel region) extending between the drain region 2A and the source region 2B, and a control or operation gate 4 connected to the channel region CH for transistor control via an intermediate gate dielectric or oxide layer 3.

The structure BS also comprises at least one stack ST extending upwards away from the substrate S1 and/or the control gate 4, the stack ST comprising a plurality of alternating (i) metal layers or extensions M and (ii) via layers or via extensions V, the metal layers or extensions M being in contact (direct contact) with at least one via layer.

The metal layers or extensions M and via layers or via extensions V can extend, for example, in a plane above a plane defined by the substrate S1 and parallel to the plane defined by a substrate S1.

The structure BS or stack ST also includes a contact layer or contact extension C directly or indirectly contacting the control gate 4 to the first metal layer M1. The contact layer or contact extension C is the first or lowest via layer or first or lowest via extension connecting the lowest or first metal layer M1 to the control gate 4. The contact layer or contact extension C electrically connects the stack ST to the control gate 4.

The metal layers or extensions M comprises or consist of a metal. The via layer or via extension V defines an electrical connection between a first and a second object in a plane, or in adjacent upper and/or lower planes or layers. The via layer or via extension V defines an electrical connection between metal layers or extensions M.

The via layer or via extension V (and contact layer or extension C) is defined by an opening or cavity in a material (for example, a dielectric material IMD) provided on the substrate S1. The via layer or via extension V comprises or consists of a conductive material, for example, a conductive fill material placed inside the opening or cavity. For example, the conductive fill material can comprise an alloy of tungsten and aluminum.

The structure BS also includes a dielectric layer or material IMD provided on the substrate S1 and surrounding or enclosing the control gate 4, and defining or enclosing the plurality of alternating metal layers M and via layers or via extensions V, as well as the contact layer C. The dielectric layer or material IMD can, for example, comprise or consist of $SiO_2$.

The structure BS may include a plurality of stacks ST, or a stack ST including a plurality of pillars P each defining a stack as shown for example in FIG. 7B.

The structure BS can also include a passivation layer 14.

The structure BS, for example, comprises or consists of FET device or devices contained on or in a CMOS chip or wafer or substrate, for instance, a 0.18 μm CMOS chip.

Contact layers or extensions may optionally also be included in contact with the drain region 2A and the source region 2B for applying a voltage or current thereto.

The FET device or sensor 1, 2, 101, 201 can be produced or fabricated from the basic structure or fabrication structure BS through processing (post-processing), for example, by removing or etching away material from the structure BS to expose a metal layer M or a via layer V that is then eventually used to receive a fluid or liquid to be analyzed, as will be explained in more detail below.

As mentioned above, exemplary ion and/or biomarker Field-Effect Transistor (FET) devices or sensors 1, 2, 101, 201 of the present disclosure are shown in FIGS. 1 to 5.

The FET device or sensor 1, 2, 101, 201 for sensing ions and/or biomarkers comprises at least one drain region 2A, at least a source region 2B, a channel region CH located or extending between the at least one drain region 2A and the at least one source region 2B, and a control or operation gate 4 connected to the channel region CH for transistor control.

The at least one drain 2A, the at least one source 2B, the channel region CH, the gate dielectric or oxide layer 3, and the control gate 4 define a Field-Effect transistor FET.

The control or operation gate 4 can be connected to the channel region CH for controlling a current in the channel CH via at least one intermediate gate dielectric or oxide layer 3. The at least one intermediate dielectric or oxide layer 3 can be, for example, in direct or indirect contact with the control or operation gate 4 and the substrate or bulk layer S1. The control or operation gate 4 is connected to the channel region CH to control or operate the transistor by, for example, the application of a voltage to the gate 4 or by changing a voltage applied to the gate 4.

The substrate S1 and channel CH may comprise or consist of a semiconductor material, for example, Silicon. The channel region CH may be an intrinsic channel region. The drain 2A and the source 2B may also comprise or consist of a semiconductor material, for example, doped Silicon. The substrate S1 and channel CH may be doped p-type and the drain 2A and source 2B may be doped n-type (or vice-versa).

The control or operation gate 4 can comprise or consist of poly-silicon or polycrystalline silicon. The at least one intermediate gate dielectric or oxide layer 3 can comprise or consist of $SiO_2$.

The FET device or sensor 1, 2, 101, 201 may further comprise at least one microfluidic channel or microfluidic structure 26, at least one stack ST and at least one further gate or layer 9 electrically connected to the control gate 4 by the at least one stack ST.

The at least one further gate or layer 9 is an upper gate 9 or an upper interface or connecting layer 9.

The stack ST defines, for example, a conductive and/or sensing bridge between the control gate 4 and the further gate or layer 9.

The further gate or layer 9 permits sensing or detection of the presence of ions and/or biomarkers in a fluid or liquid. The further gate or layer 9 defines an interface or intermediate layer directly or indirectly connecting or contacting the at least one stack ST to the at least one microfluidic channel or structure 26.

The further gate or layer 9 defines an interface or intermediate layer (indirectly) connecting or contacting the control gate 4 of the transistor to the at least one microfluidic channel or structure 26.

The further gate or layer 9 defines an active layer of the FET sensor device.

The at least one microfluidic channel or structure 26 is (directly or indirectly) connected to or located (directly or indirectly) on the further gate or layer 9.

The at least one stack ST extends upwards away from the substrate or bulk layer S1 and/or away from the control gate 4.

The at least one stack ST comprises a plurality of alternating (i) metal layers or metallic extensions M,6,9 and (ii) via layers or via extensions V,7,8.

The metal layers or metallic extensions may, for example, have a width (X-direction) of between 0.01 μm and 500 μm. The metal layers or metallic extensions may, for example, have a length (Y-direction) of between 0.01 μm and 500 μm. The metal layers or metallic extensions may, for example, have a height (Z-direction) of between 0.01 μm and 20 μm.

The via layers or via extensions may, for example, have a width (X-direction) of between 0.01 μm and 500 μm, have a length (Y-direction) of between 0.01 μm and 500 μm and have a height (Z-direction) of between 0.01 μm and 20 μm.

The metal layers or metallic extensions M,6,7 are for example in contact (direct contact) with at least one via layer or extension V: or for example one via layer or extension V: or for example two via layers or extensions V.

The metal layers or extensions M,6,7 and via layers or via extensions V,7,8 can extend, for example, in a plane above a plane defined by the substrate or bulk layer S1 and parallel to the plane defined by a substrate or bulk layer S1.

For example, as shown in FIGS. 1 to 4, the metal layers or extensions M,6,7 and via layers or via extensions V,7,8 extend longitudinally in an X-direction and a Y-direction, and define a height or thickness in a Z-direction. The metal layers or extensions M,6,7 and via layers or via extensions V,7,8 are superposed or stacked one onto the other to define a vertically extending structure in the Z-direction.

The stack ST also includes a contact layer or contact extension C,5 directly or indirectly contacting the control gate 4 to a first metal layer or metallic extension M1,6. The contact layer or contact extension C,5 is the first or lowest via layer or first or lowest via extension connecting the lowest or first metal layer M1,6 to the control gate 4. The contact layer or contact extension C,5 electrically connects the stack ST to the control gate 4.

The metal layers or metallic extensions M,6,7 are for example in contact (direct contact) with at least one via layer or extension V,7,8: or for example one via layer or extension V,7,8: or for example two via layers or extensions V,7,8.

The metal layers or extensions M,6,7 comprises or consist of a metal, for example, Aluminum, Copper, or Tungsten. Further examples can be found in reference [4]. The via layer or via extension V,7,8 defines an electrical connection between a first and a second object in a plane or layer, or between a first and a second object in adjacent upper and/or lower planes or layers. The via layer or via extension V,7,8 defines, for example, an electrical connection between the metal layers or metallic extensions M, 6,7.

The via layer or via extension V,7,8 (and contact layer or extension C,5) is defined by an opening or cavity in a material (for example, a dielectric material IMD) provided on the substrate or bulk layer S1. The via layer or via extension V,7,8 comprises or consists of a conductive material, for example, a conductive fill material placed inside the opening or cavity. For example, the conductive fill material can comprise an epoxy matrix containing silver coated copper particles.

The further gate or layer 9 is electrically conductive and can comprise or consist of a metal or a conductive material, for example, Aluminum, Gold, or Platinum.

The further gate or layer 9 comprises or consists of or is the metal layer or metallic extension M, 6,7, Alternatively, the further gate or layer 9 comprises or consists of or is the via layer or via extension V,7,8.

Depending on whether the further gate or layer 9 comprises or consists of or is the metal layer or metallic extension or the via layer or via extension, the stack ST may include different elements.

The stack ST can comprise or consist of (i) at least one via layer or via extension V,7,8 and (ii) at least one metal layer or metallic extension M,6,7.

The stack ST can comprise or consist of (i) one via layer or via extension V,7,8 and (ii) one metal layer or metallic extension M, 6,7; where the one via layer or via extension V,7,8 comprises or consists of or is the contact layer or contact extension C,5.

The stack ST can comprise or consist of (i) a first via layer or via extension V and (ii) one metal layer or metallic extension M,6 and (iii) a second via layer or via extension V,7; where the first via layer or via extension V comprises or consists of or is the contact layer or contact extension C,5.

The stack ST can comprise or consist of (i) a first via layer or via extension V and (ii) a first metal layer or metallic extension M,6 and (iii) a second via layer or via extension V, 7 and (iv) a second metal layer or metallic extension M:

where the first via layer or via extension V comprises or consists of or is the contact layer or contact extension C,5.

The stack ST can comprise or consist of a plurality of via layers or via extensions V,7,8 and a plurality of metal layers or metallic extensions M, 6,7.

Alternatively, the stack ST can consist solely of one via layer or via extension V, where the via layer or via extension V comprises or consists of or is contact layer or contact extension C,5.

Figure 2A:
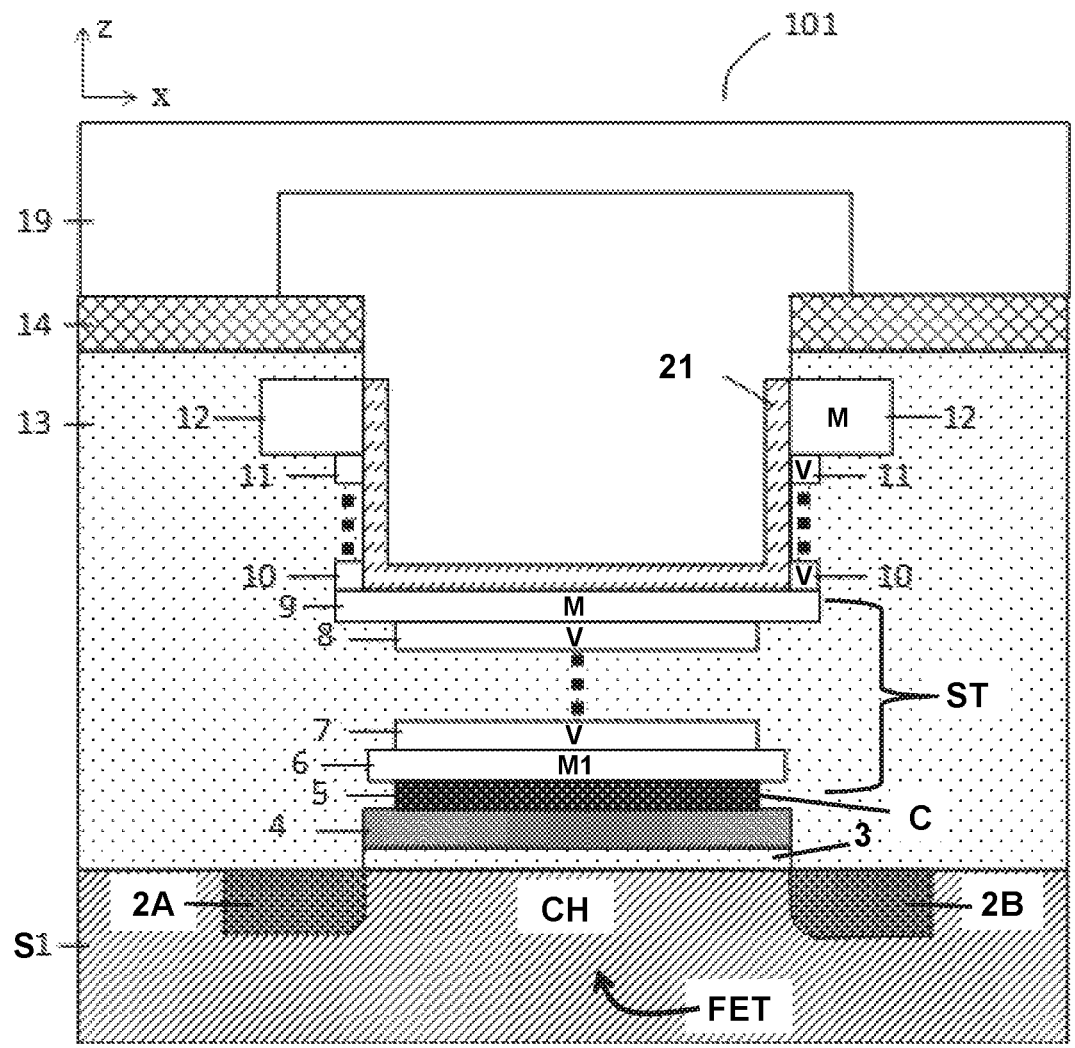
FIG. 2A shows a cross-sectional view of an ion, and/or molecule and/or biomarker Field-Effect Transistor (FET) device according to another embodiment of the present disclosure.
Figure 2B:
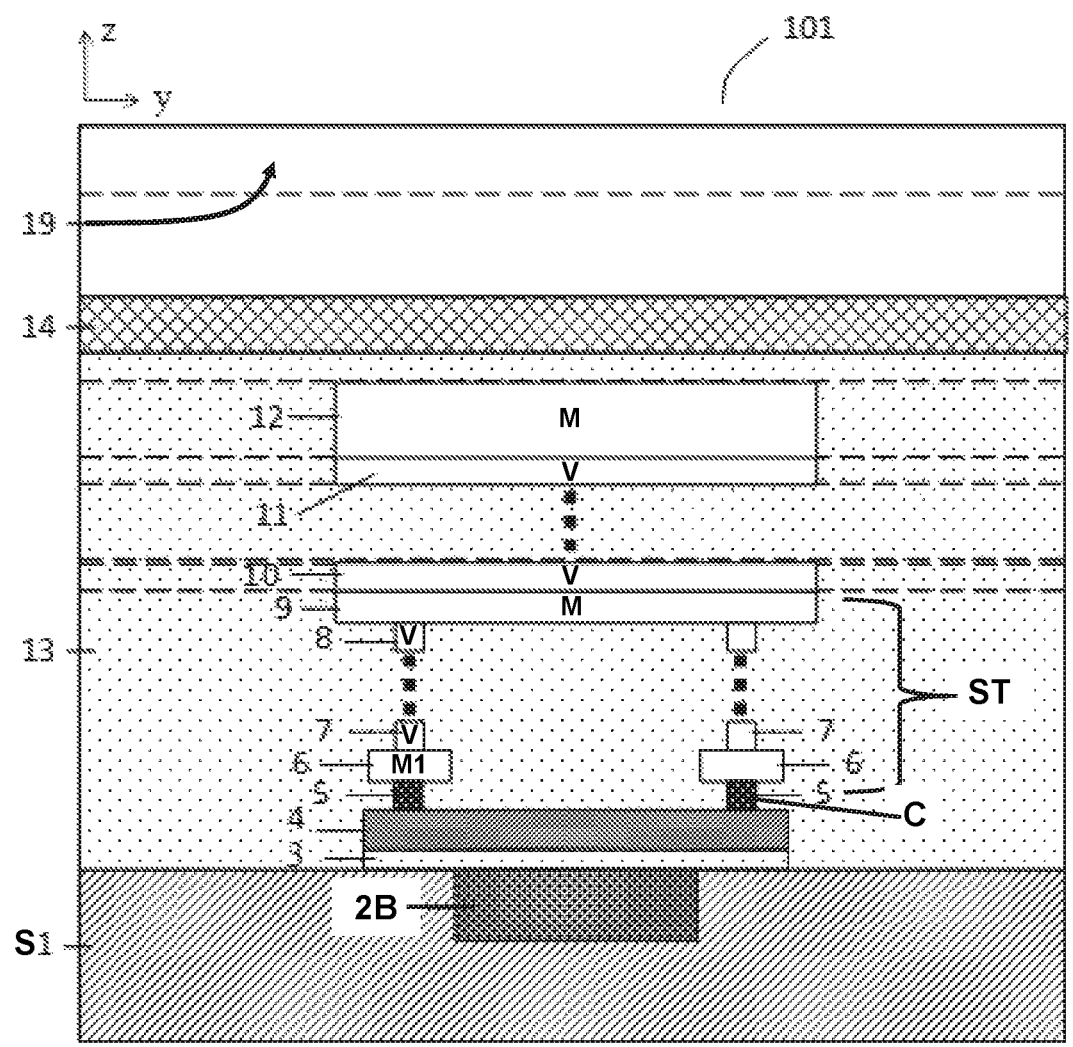
FIG. 2B shows another cross-sectional view of the exemplary ion, and/or molecules and/or biomarker Field-Effect Transistor (FET) device shown in FIG. 2A.

The FET device or sensor 1, 2, 101, 201 may include a plurality of stacks ST, or a stack ST including a plurality of pillars P, as for example shown in FIG. 2B. The pillar P may contain the same elements as a stack ST described above.

The metal layer or metallic extension or the via layer or via extension defining the further gate or layer 9 can, for example, define a larger surface area or volume than the other elements in the stack ST and/or pillar P. This permits to define a larger sensing surface to increase, for instance, sensitivity of the device or sensor.

The further gate or layer can, for example, have a width (X-direction) between 0.01 μm and 500 μm, a height (Z-direction) between 0.01 μm and 20 μm and a length (Y-direction) between 0.01 μm and 500 μm.

The at least one microfluidic channel or structure 26 comprises or is defined by, for example, at least one or a plurality of side-walls SW, for example a first side-wall SW1 and a second side-wall SW2. The further gate or layer 9 may define a floor FL or a portion of the floor FL of the microfluidic channel or structure 26. The floor FL extends between the first side-wall SW1 and the second side-wall SW2.

The microfluidic channel or structure 26 can, for example, have a width (X-direction) between 0.02 μm and 100 μm, or 0.02 μm and 500 μm, or 10 μm and 500 μm; a height (Z-direction) between 0.05 μm and 20 μm, or 0.05 μm and 500 μm, or 10 μm and 500 μm; and a length (Y-direction) between 0.02 μm and 100 μm, or 0.02 μm and 20 cm, or 10 μm and 20 cm.

The microfluidic channel or structure 26 can extend (for example, in an upper plane parallel to the plane defined the substrate or layer 1) to define a microfluidic network to distribute a fluid or liquid-under-test (LUT) to different locations on or across the FET device or sensor 1, 2, 101, 201 or the die comprising the FET sensor device.

The microfluidic channel or structure 26 can also include further side-walls configured to enclose a fluid inside the microfluidic channel or structure 26, for example, a third side-wall and a fourth side-wall. An inlet and outlet may also be included to insert and remove a fluid to and from the microfluidic channel 26.

The microfluidic channel or structure 26 can for example be sealed with a sealing material, and microfluidic channel 26 comprises fluid or liquid input inlets and leaving outlets.

The microfluidic channel or structure 26 can thus include a plurality of side walls SW, for example, two or four side walls SW.

The microfluidic channel or structure 26 may for example, define a well or hole to receive a liquid or define a periodic pattern or a periodic repeating pattern.

The FET device or sensor 1, 2, 101, 201 can also include a passivation layer 14, for example, $Si_3N_4$.

The FET device or sensor 1, 2, 101, 201 can also include an upper or superposed layer or material 13, IMD for example a dielectric layer or dielectric material IMD provided on the substrate or bulk layer S1. The layer or material 13, IMD may surround or enclose the control gate 4, and/or define or enclose the metal layers or metallic extensions M and/or the via layers or via extensions V, as well as the contact layer C. The dielectric layer or material IMS can, for example, comprise or consist of $SiO_2$.

Figure 1A:
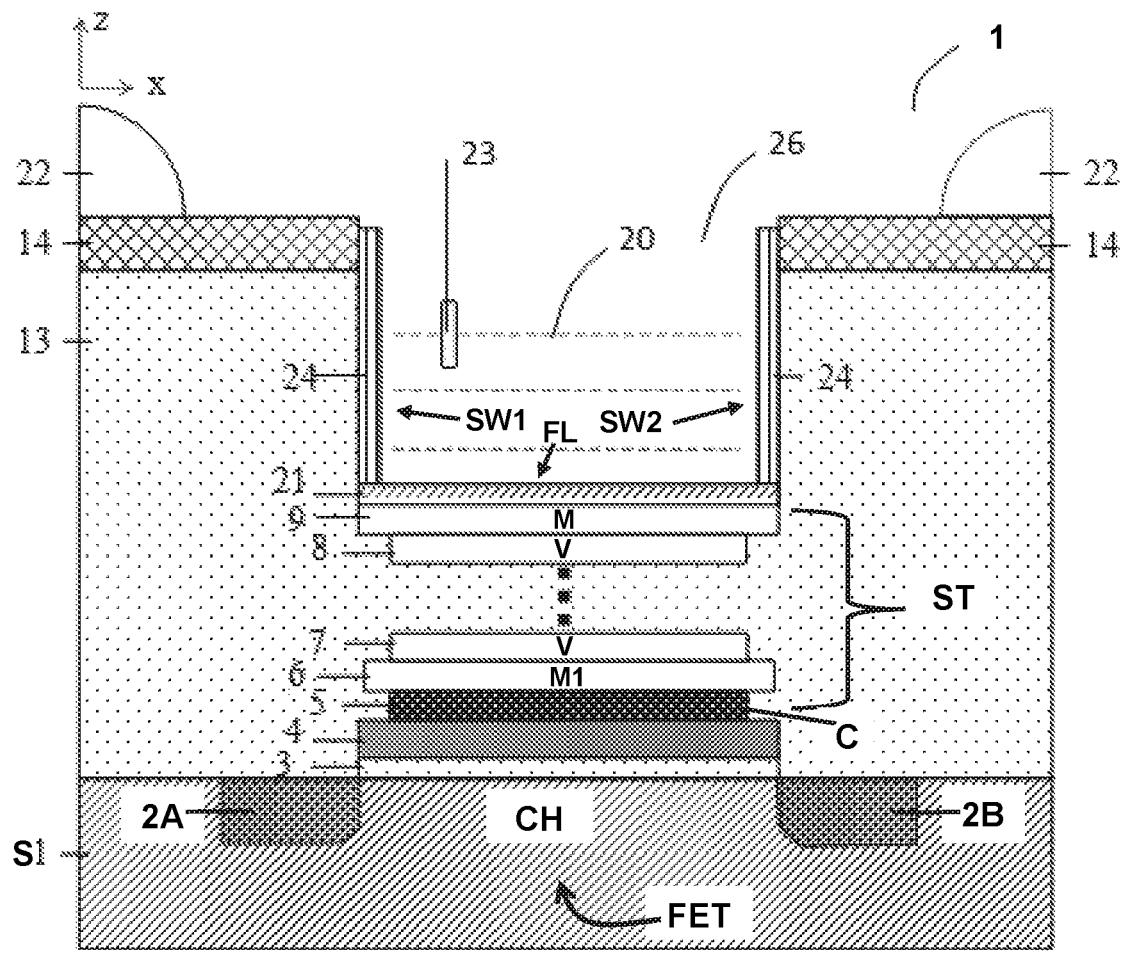
FIG. 1A shows a cross-sectional view of an exemplary ion, and/or molecule and/or biomarker Field-Effect Transistor (FET) device according to an embodiment of the present disclosure.

The passivation layer 14 and/or the upper or superposed layer or material 13 may for example delimit or define one or more side-walls SW (or a portion thereof) of the microfluidic channel 26, for example the first side-wall SW1 and the second side-wall SW2 as shown in the exemplary embodiment of FIG. 1A.

The FET device or sensor 1, 2, 101, 201 can also include a sensing material or probe layer 21 for sensing ions and/or biomarkers in a fluid.

The further gate or layer 9 can include the sensing material or probe layer 21 (or a plurality of sensing materials or probe layers) for sensing ions and/or biomarkers in a fluid. The further gate or layer 9 may define the sensing material or probe layer 21.

The further gate or layer 9 can include a top oxide layer or a sensing membrane 21 provided on the further gate or layer 9 and defining the sensing material or probe layer.

The top oxide layer or the sensing membrane is directly or indirectly in contact with the further gate or layer 9.

The sensing material or probe layer 21 is located on the further gate or layer 9 to render the device sensitive or selectively sensitive to specific bio/chemical species.

The sensing material or probe layer 21 may, for example, include at least one or a plurality of DNA/RNA strands, and/or at least one or a plurality of antigens or antibodies, and/or at least one or a plurality of biotins, and/or at least one or a plurality of enzymes, and/or at least one or a plurality of ion sensitive materials.

The sensing material or probe layer 21 may thus be a functionalized sensing layer. The external surface of the sensing material or probe layer 21 may be functionalized.

Figure 1B:
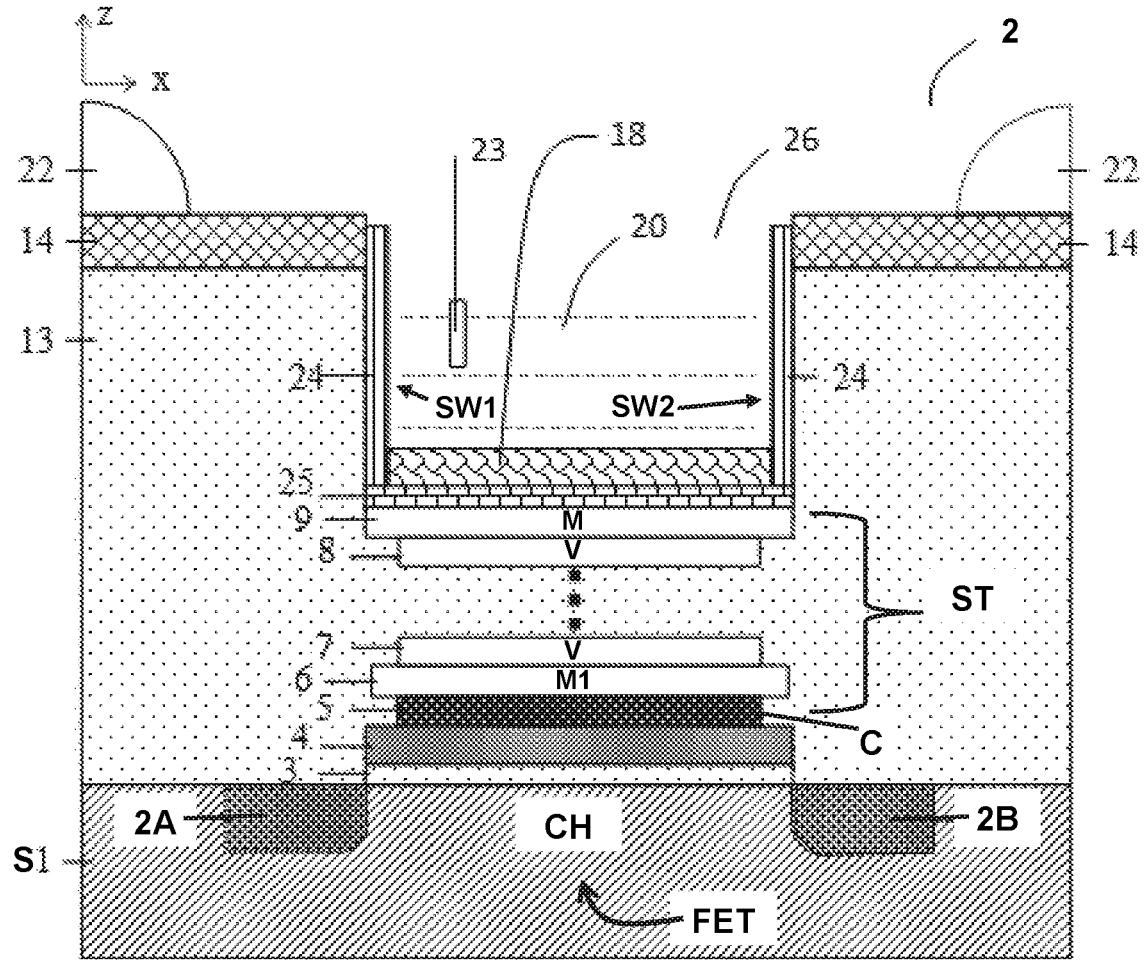
FIG. 1B shows a cross-sectional view of an exemplary ion, and/or molecule and/or biomarker Field-Effect Transistor (FET) device according to another embodiment of the present disclosure.

The sensing material or probe layer 21 may comprise or consist solely of a noble metal 25 (FIG. 1B). The sensing material or probe layer 21 may, for example, also include or consist of (i) a noble metal or native oxide and (ii) at least one or a plurality of DNA/RNA strands, and/or at least one or a plurality of antigens or antibodies, and/or at least one or a plurality of biotins, and/or at least one or a plurality of enzymes, and/or at least one or a plurality of ion sensitive materials at least one or a plurality of polymers.

The noble metal 25 or native oxide can be in direct contact with the further gate or layer 9 and the DNA/RNA strands, and/or antigens, and/or biotins, and/or enzymes, and/or ion sensitive materials.

The Field-Effect Transistor (FET) device or sensor is functionalized to sense or capture the targeted analytes or chemical species.

The stack ST defines, for example, a conductive and/or sensing bridge between the control gate 4 and the sensing material or probe layer 21 in physical and electrical contact with the further gate or layer 9. This permits the transistor to sense or detect ions and/or biomarkers in a fluid located above the further gate or layer 9 and in the microfluidic channel 26.

The FET device or sensor 1, 2, 101, 201 can also further include a protection material 24 located on the side-walls SW or on an outer surface of the microfluidic channel 26 to protect device circuitry or circuitry element of the FET device or sensor 1, 2, 101, 201.

The FET device or sensor 1, 2, 101, 201 can also further include a lid structure or layer or an add-on structure or layer 19, 22 configured to confine liquid-under-test LUT in the microfluidic channel 26. The lid structure 19, 22 is, for example, configured to seal and/or expose the microfluidic channel 26.

The lid structure 22 can, for example, be configured to completely seal the microfluidic channel 26. The lid structure 22 is, for example, configured to define the microfluidic channel network and distribute a fluid or liquid LUT to different locations on the FET device or sensor 1, 2, 101, 201 or on the die comprising the FET sensor device.

The lid or add-on structure 19, 22 and/or the microfluidic channel or structure 26 are, for example, configured or structured to define a microfluidic channel network and to distribute a liquid to different locations on the FET device or on a die comprising the FET device or sensor.

The lid or add-on structure 19, 22 can cover (or close) partially or fully the microfluidic channel or structure 26.

Like the microfluidic channel or structure 26, the lid or add-on structure 19, 22 may include, for example, at least one channel or structure defined in the lid or the add-on structure or layer 19, 22 that extends to define a microfluidic channel network therein.

The add-on structure 19, 22 and the microfluidic channel or structure 26 may each define a microfluidic channel network through which the liquid is received or distributed via capillary action in only the add-on structure 19, 22 or only the microfluidic channel or structure 26. The add-on structure 19, 22 and the microfluidic channel or structure 26 can be in fluid communication with each other (their respective microfluidic channel networks in fluid communication with each other) to distribute a liquid from one to the other and to different locations on the FET device or on a die comprising the FET device or sensor. The add-on structure 19, 22 and the microfluidic channel or structure 26 may also, for example, together define partially or fully the microfluidic channel network.

The microfluidic channel network may thus comprise sections defined only by the add-on structure 19, 22 or only by the microfluidic channel or structure 26, or the add-on structure 19, 22 superposed on the microfluidic channel or structure 26.

The add-on structure 19, 22 and/or the microfluidic channel or structure 26 are, for example, configured or structured to distribute the liquid by capillarity or capillary action. The add-on structure 19, 22 and/or the microfluidic channel or structure 26 may, for example, have a height and/or width between 1 micron and 1000 microns or between 10 microns and 200 microns.

The add-on structure 19, 22 and/or the microfluidic channel or structure 26 can, for example, also be configured or structured to collect the liquid by capillarity or capillary action from a surface of an external object in proximity to or in contact with an external surface of the FET device or sensor. The external surface may, for example, be an outer surface of the FET device or sensor defined by the add-on structure 19,22 and/or by the microfluidic channel or structure 26.

This liquid being collected may, for example, be sweat and the external object is, for example, skin.

The add-on structure 19, 22 (and/or the microfluidic channel or structure 26) may include at least one or a plurality of entrance apertures (on a top surface or a lateral surface) in fluid communication with the microfluidic channel network defined therein. The liquid is received through the entrance aperture via capillary action and/or distributed through the network via capillary action.

The add-on structure 19, 22 (and/or the microfluidic channel or structure 26) may include at least one or a plurality of exit apertures (on a top surface or a lateral surface) in fluid communication with the microfluidic channel network and entrance apertures and through which the liquid is evacuated via capillary action.

The microfluidic channel or network 26 may comprise an opening that is configured to be sealed with a conformal surface where a measurement of liquid is performed, for example by the skin of a device user.

The FET device or sensor 1, 2, 101, 201 may further include a reference electrode 23 to be placed in the fluid or liquid being analyzed and to set a bias or reference voltage or to maintain the liquid or fluid at a substantially constant potential. The reference electrode 23 is placed for example in the microfluidic channel 26 or in fluidic communication with the microfluidic channel 26.

The reference electrode is for example electrically connected to the sensing material or probe layer 21 by the fluid or liquid in the microfluidic channel 26.

The reference electrode 23 may comprise or consist of a lumped reference electrode, or a miniaturized-reference electrode (MRE) integrated on-chip, or a miniaturized quasi reference electrode (MQRE) integrated on-chip.

The reference electrode 23 may, for example, comprises or consists of an on-device or on-chip Ag/AgCl miniaturized quasi reference electrode (MQRE).

As mentioned above, the passivation layer 14 and/or the upper or superposed layer or material 13 may for example delimit or define one or more side-walls SW (or a portion thereof) of the microfluidic channel 26. The reference electrode 23 may thus be located on a portion of the passivation layer 14 or the upper or superposed layer or material 13 defining a wall or surface of the microfluidic channel 26.

The miniaturized-reference electrode (MRE) integrated on-chip or on-device, or the miniaturized quasi reference electrode (MQRE) integrated on-chip or on-device can be located on or sitting on top of the passivation layer 14, or located on or sitting on top of a part of the passivation layer 14 after partly etching the passivation layer 14 to, for example, define a landing or surface configured to receive the electrode 23.

The miniaturized-reference electrode (MRE) integrated on-chip or on-device, or the miniaturized quasi reference electrode (MQRE) integrated on-chip or on-device can alternatively be located on or sitting on top of the IMD layer 13, or located on or sitting on top of a part of the IMD layer 13 after partly etching the IMD layer 13 to, for example, define a landing or surface configured to receive the electrode 23.

The miniaturized-reference electrode (MRE) integrated on-chip or on-device, or the miniaturized quasi reference electrode (MQRE) integrated on-chip or on-device can alternatively be formed or situated on or on top of one of the metal layers M or via layers V or the contact layer C, for example, during in the CMOS process.

The miniaturized-reference electrode (MRE) integrated on-chip or on-device, or the miniaturized quasi reference electrode (MQRE) integrated on-chip or on-device is configured to form an electrical contact with a sensing surface of the sensing material or probe layer 21 through a (conductive) liquid or fluid present in the microfluidic channel 26.

The FET device or sensor 1, 2, 101, 201 may further include at least one or a plurality of via layers or via extension V,10,11 and/or at least one or a plurality of metal layers or metallic extensions M, 12 defining at least one or a plurality of side walls SW of the microfluidic channel 26 (see for example, FIGS. 2A and 2B). The side walls are, for example, in contact with the further gate or layer 9. This advantageously defines an active area with a higher surface to volume ratio for performing sensing of ions and/or biomarkers.

The side wall or side walls may also include the sensing material or probe layer 21 previously described. The side wall or side walls may include, for example, a native oxide layer defining the sensing material or probe layer.

The side wall or side walls may include, for example, a noble metal located on the side wall or side walls SW, or located between the side wall or side walls SW and the further gate or layer 9 to define a floor or portion of a floor of the sensing material or probe layer and/or microfluidic channel 26.

The sensing material or probe layer 21 may, for example, also include or consist of (i) a noble metal and (ii) at least one or a plurality of DNA/RNA strands, and/or at least one or a plurality of antigens, and/or at least one or a plurality of biotins, and/or at least one or a plurality of enzymes, and/or at least one or a plurality of ion sensitive materials.

The FET device or sensor 1, 2, 101, 201 can be, for example, a Foundry fabricated biological or chemical FET fabricated during or in a (commercial) CMOS process using or with Front-end-of-line FEOL and back-end-of-line BEOL with any number of or a plurality of metallization layers.

The native oxide 21 of the further gate or layer 9 can, for example, be formed from the metal of the further gate or layer 9 being exposed to oxidation during the foundry fabrication process.

The microfluidic channel 26 can, for example, be formed by an etching step or process during the CMOS fabrication process.

The FET device or sensor 1, 2, 101, 201 comprises or consists of an ion sensitive FET.

The present disclosure also concerns a Point-of-Care or wearable device including the FET device or sensor 1, 2, 101, 201.

The present disclosure also concerns a method for producing the FET device or sensor 1, 2, 101, 201. The method includes providing the basis structure BS, and removing or etching away material from the structure BS to expose a metal layer or metallic extension M or a via layer or via extension V to define the microfluidic channel 26, the metal layer M or a via layer V defining a floor or support layer FL of the microfluidic channel 26.

In other words, providing the basis structure BS comprising the at least one semiconductor substrate or bulk layer S1, the at least one semiconductor drain region 2A, the at least one semiconductor source region 2B, the at least one semiconductor channel region CH extending between the drain region 2A and the source region 2B, and the at least one control or operation gate 4 connected to the channel region CH for transistor control via an intermediate gate dielectric or oxide layer 3; and further comprising the at least one stack ST extending upwards away from the substrate S1 and/or the control gate 4, the stack ST comprising a plurality of alternating (i) metal layers or extensions M and (ii) via layers or via extensions V, the metal layers or extensions M being in contact (direct contact) with at least one via layer, and further comprising the dielectric layer or material IMD provided on the substrate S1 and surrounding or enclosing the control gate 4, and defining or enclosing the plurality of alternating metal layers M and via layers or via extensions V.

The structure BS that is etched can also include at least one passivation layer 14 or a plurality of passivation layers 14 comprising or consisting of different materials.

The material that is removed can include (i) the passivation layer 14 and/or (ii) the dielectric layer or material IMD 13 and/or (iii) metal layers or extensions M and/or (iv) via layers or via extensions V.

The sensing material or probe layer 21 can then be provided on the exposed metal layer or metallic extension M, or the exposed via layer or via extension V.

The structure BS, for example, comprises or consists of FET device or devices contained on or in a CMOS chip or wafer or substrate, for instance, a 0.18 μm CMOS chip.

By removing or etching away material from the structure BS to expose a metal layer M or a via layer V and providing the sensing material or probe layer 21, ions and/or biomarkers in a fluid or liquid in the microfluidic channel 26 and in contact with the sensing material or probe layer 21 can be sensed or detected by the gate layer 4 of the transistor.

The method can also include providing one or more of the elements of the FET device or sensor 1, 2, 101, 201 previously described above.

Further details of different embodiments of the FET device or sensor 1, 2, 101, 201 and methods for producing said device are now set out below.

The structures of biological or chemical FETs 1, 2, 101, 201 described in this disclosure can advantageously be fabricated in a commercial CMOS process with Front-end-of-line FEOL and back-end-of-line BEOL fabrication or processes with a plurality of or any number of metallization layers. The bio/chem FET 1, 2, 101, 201 may be fabricated in any CMOS technology node with any kind of semiconductor material, for example Si, SiGe, etc.

FIG. 1A shows a typical cross section of an exemplary bio/chem FET 1 to be discussed further herein. An n-type (or p-type) FET device with bulk layer S1, n+ (or p+) doped source 2A and drain regions (layer 2B), gate oxide layer 3, and gate layer 4.

The gate 4 of the FET device is extended through stacks of metallization layers 6, 9, VIA layers 7, 8 and contact layer(s) 5, to one of the metal layers (active layer). In this exemplary FIG. 1A, the bio/chem FET's gate 4 is extended until one of the intermediate layers 9, and it is shown here only as an example.

Similar structures may be realized with gate 4 extended to other metal layers (including the top metal MU (see FIG. 7A for example) and the bottom metal M1) in the CMOS process, by removing for example the passivation 14, inter-metal oxide (IMD) 13, VIA layers and metallic layers sitting on top of the target layer. The active layer can, for example, be defined by a metal layer M that is a bigger electrode or an electrode defining a large surface area compared to other metal layers M and that covers part of the surface of the CMOS chip.

The passivation, oxide, VIA and metallic layers sitting on top of the active layer are, for example, removed through controlled etching in foundry process.

A microfluidic channel 26 is formed in foundry through, for example, controlled etching of the passivation 14 and part of the IMD 13. A complex microfluidic network may be shaped in that manner, notably in order to deliver a fluid to different positions on the device or die.

A layer of sensing material/probe (DNA/RNA strand, antigen, antibody, biotin, enzyme, ion sensitive material, or polymer etc.) 21 is formed on top of the active layer 9 to make the bio/chem FET sensitive to specific bio/chemical species.

The sensing material 21 may also be the native oxide layer that grows naturally when the metal of the exposed layer 9 is exposed to air.

In FIG. 1B, in bio/chem FET 2, a layer of noble metal 25 is, for example, formed on top of the active metal 9 instead of or in addition to the sensing material previous mentioned.

A layer of sensing material/probe (DNA/RNA strand, antigen, biotin, enzyme, ion sensitive material, polymer etc.) 18 can be formed on top of the noble metal 25 to make the bio/chem FET sensitive to specific bio/chemical species.

The sensing materials 18, 21 react to the bio/chemical species of interest, thus transducing bio/chemical signals into electric signals.

A layer of protection material 24 can, for example, be formed on the walls SW of the microfluidic channel 26, in order to protect the integrated circuit or electronic element of the device from getting wet.

A lid or add-on layer 22 may for example also be formed on top of the device or die, in order to contain the liquid under test (LUT) in particular (or any fluid in general) 20. The addon layer may be either exposing or sealing the channel.

The addon layer 22 may be absent and is optional.

The addon layer 22 may be utilized to shape a complex microfluidic network, in order to deliver the LUT to different positions on the device or die.

A reference electrode 23 is immersed in the LUT, in order to bias the floating gate of the bio/chem FET through the liquid. The reference electrode 23 may be either a commercial lumped reference electrode, or a miniaturized-reference electrode (MRE) or miniaturized quasi reference electrode (MQRE) that is integrated on chip.

An example of an on-chip Ag/AgCl MQRE is explained here. A Chromium layer is deposited on the area designed for the reference electrode. The chromium layer is used as adhesion layer for the Silver layer to be deposited on top. Then an $FeCl_3$ solution is put in contact with or deposited on top of the silver layer in order to form a layer of AgCl. This Ag/AgCl quasi reference electrode is protected by a membrane, typically a polymer membrane loaded with an electrolyte solution, deposited further on top, in order to keep the AgCl inside the reference electrode region (e.g. by preventing/limiting Redox reactions, dissolution, flaking off, etc.) for longer lifetime and/or stability of the potential of the reference electrode.

FIGS. 2A and 2B show cross sections of an exemplary surface-to-volume ratio enhanced (for example, 2-walls) bio/chem FET 101. The active area is defined by an intermediate-metal layer 9, together with the Aluminum VIAs 10, 11 and metals 12 which are connecting intermediate-metal layer 9 through to the top metal layer of the process. Again, this intermediate-metal layer 9 is shown here only as an example, and other metal layers may be used to realize this structure.

Compared to bio/chem FET 1, which used the same metal layer to define the sensing area, bio/chem FET 101 has a higher surface to volume ratio. Bio/chem FET 1's surface area is defined only by the active metal layer 9, while bio/chem FET 101's surface area is defined by the side walls formed by 10, 11, 12 plus the active metal layer 9. The volume is defined as the volume occupied by the bio/chem FET sensor in the device or die.

The height of the side wall may range from typically 0.01 μm to 50 μm, whereas the length of the area defined only by metal 9 range from typically 0.02 μm to 500 μm, depending on the technology node applied. Thus, the surface may be significantly increased. Improved signal to noise ratio and higher integration density can be expected.

The etching of microfluidic channel 26; formation of sensing materials 21, or noble metal 25 plus sensing materials 18, protection layer; formation of addon layer 22; reference electrode 23 are the same as described above in relation to the device of FIG. 1.

The formation of noble metal may also cover the side walls.

The formation of sensing materials may also cover the side walls.

The microfluidic channel 26 may also take the form shown in FIG. 2. Instead of having for example 4 side walls as for example discussed in relation to FIG. 1, this channel 26 may for example have only 2 side walls. The microfluidic channel 26 thus may extend to other positions on the device or die to form a more complex microfluidic channel network.

It may also include lid or add-on layer 19 as shown in FIG. 2, to seal the microfluidic channel 26 completely.

As described for addon layer 22 in FIG. 1, the addon layer 19 can also be shaped to deliver the LUT to different positions on the device or die.

The microfluidic channel network formed by the addon 19 and 22 does not have to be complementary to the microfluidic channel etched in the die through foundry process.

Figure 3A:
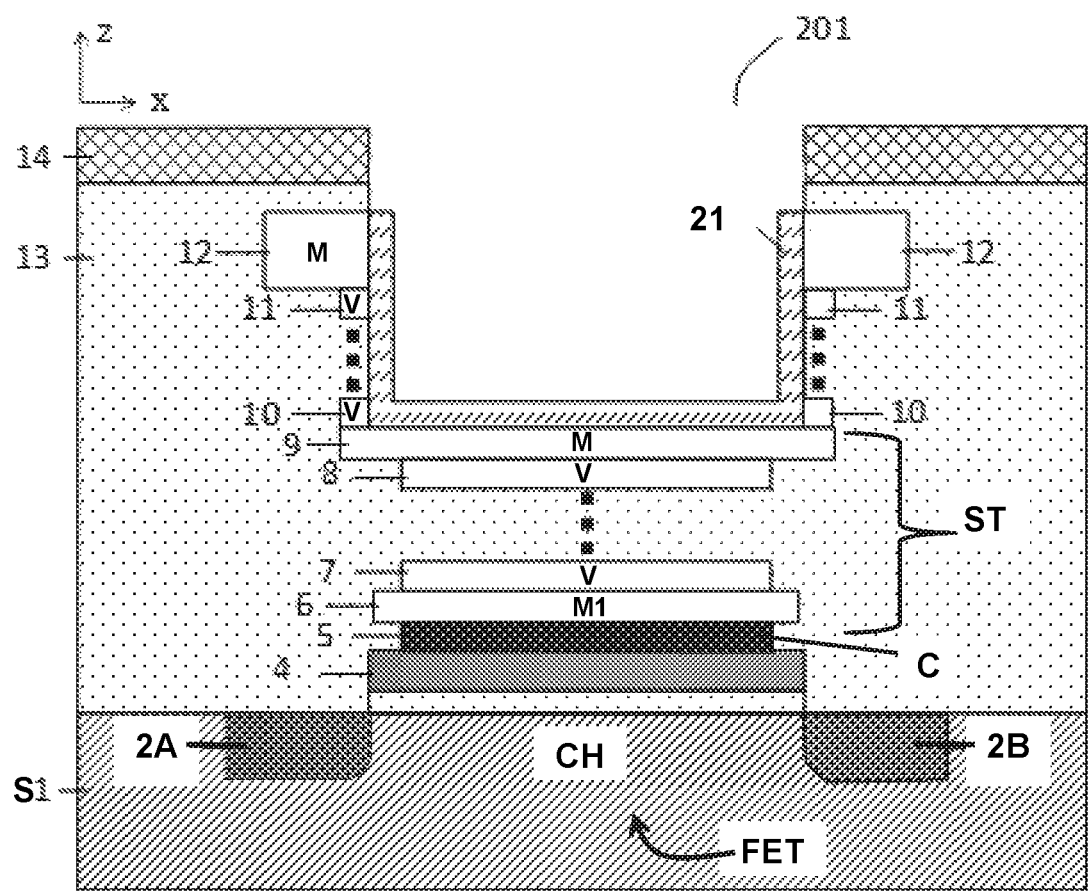
FIG. 3A shows a cross-sectional view of an ion, and/or molecule and/or biomarker Field-Effect Transistor (FET) device according to another embodiment of the present disclosure.
Figure 3B:
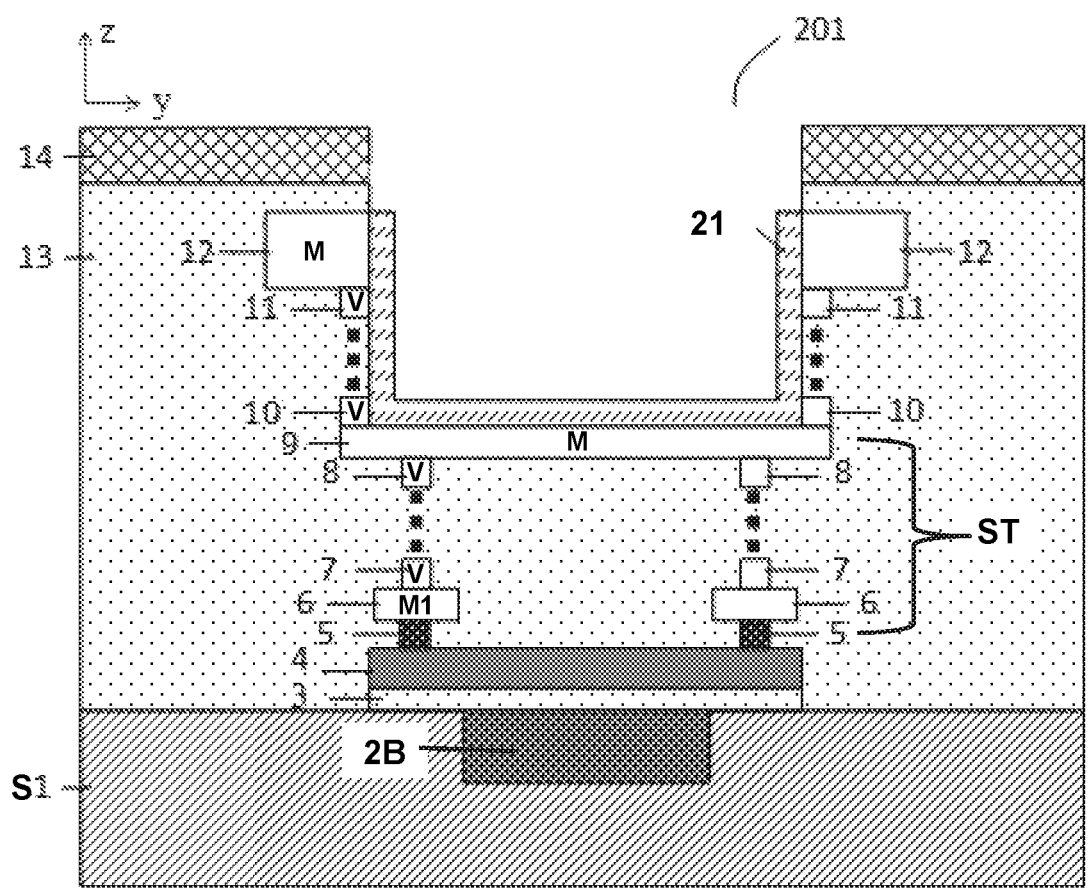
FIG. 3B shows another cross sectional of the exemplary ion, and/or molecule and/or biomarker Field-Effect Transistor (FET) device shown in FIG. 3A.

FIG. 3 shows cross sections of a surface to volume ratio enhanced (for example, 4-walls) bio/chem FET 201.

The surface to volume ratio is increased further compared to that described in bio/chem FET 101, due to more side wall area being utilized.

The etching of microfluidic channel 26; formation of sensing materials 21, or noble metal 25 plus sensing materials 18, protection layer; formation of addon layer 22,19; reference electrode 23 may be the same as previously described in relation to the device of FIG. 1.

The addon layer may also be the same as previously described in relation to FIG. 2 and addon layer 19.

The microfluidic channel 26 may be sealed with the conformal surface where the measurement of liquid is carried out (for example, skin of a device user may be used to seal the microfluidic channel 26).

The sensing material/probe (DNA/RNA strand, antigen, biotin, enzyme, ion sensitive material, or polymer etc.) formed as a sensing surface, may for example be in the form of a drop of liquid. The embodiments shown in FIG. 1 and FIG. 3 may for example inherently have side walls all around to prevent the spreading of those liquid materials to unwanted positions of the die.

The MRE/MQRE 23 that is integrated on chip or on-device, can be sitting on top of the passivation layer 14.

The MRE/MQRE 23 that is integrated on chip or on-device, can be sitting on top of part of the passivation layer 14 after partly etching it.

The MRE/MQRE 23 that is integrated on chip or on-device, can be sitting on top of the IMD layer 13.

The MRE/MQRE 23 that is integrated on chip or on-device, can be sitting on top of part of the IMD layer 13 after partly etching it.

The MRE/MQRE 23 that is integrated on chip or on-device, can also be made on top of one of the metal layers M in the CMOS process.

The MRE/MQRE 23 that is integrated on chip or on-device, can also be made on top of one of the VIA layers V in the CMOS process.

The MRE/MQRE 23 that is integrated on chip or on-device, can also be made on top of the contact layer C in the CMOS process.

The consideration for the MRE/MQRE 23 is that once the microfluidic channel 26 is filled with conductive liquid, the MRE/MQRE should preferably be in good contact with the FET device or ISFET sensing surface through the liquid.

The sensing areas defined by one of the metal layers M can instead be defined by one of the VIA layers V. Alternatively, the sensing areas defined by one of the metal layers M can instead be defined by one of the contact layers C. While one contact layer is shown in the Figures, there can be more than one contact layer.

The present disclosure thus concerns a Foundry fabricated bio/chem FETs that can be fabricated for example in a commercial CMOS processor using FEOL and BEOL and with a plurality or with any number of metallization layers. The fabricated FET device or sensor 1, 2, 101, 201 may contain: a microfluidic channel fabricated on the same die through standard foundry process, a functionalized layer of sensing materials, or a noble metal and sensing materials, a reference electrode to set the bias voltage of the floating gate in liquid.

The sensing material can be for example the native oxide of the active metal exposed in the foundry process.

The sensing material can be for example confined in or on walls defined by a microfluidic channel etched in the CMOS process.

The sensing surface area to volume ratio can for example be increased, by taking advantage of the walls defined by a microfluidic channel etched in the CMOS process.

The sensing material can be confined in or on walls defined by the metallization and VIA layers of the CMOS process or exposed by the CMOS processing method.

The sensing surface area to volume ratio can be increased, by taking advantage of walls defined by metallization and VIA layers exposed in the CMOS process.

The microfluidic channel is, for example, not confined within a small area near the active metal layer but extended along or across on the die or device.

The microfluidic channel can be sealed with a sealing material. Leaving inlets and outlets can be provided for a liquid under test to flow.

The microfluidic channel can for example be completely not sealed before device use. It can be sealed with the conformal surface where the measurement of liquid is done (for example, by the skin of a device user).

The reference electrode can comprise or consist of an MRE that is integrated on the same chip or device.

The reference electrode can comprise or consist of a MQRE that is integrated on the same chip or device.

The MRE/MQRE can be for example sitting on top of the passivation layer used in a commercial CMOS process.

The MRE/MQRE can be for example sitting on top of the IMD layer used in a commercial CMOS process.

The MRE/MQRE can be for example sitting on top of one of the metal layers used in a commercial CMOS process.

The MRE/MQRE can be for example sitting on top of one of the VIA layers used in a commercial CMOS process.

The MRE/MQRE can be for example sitting on top of one of the contact layers used in a commercial CMOS process.

The Industrial sectors concerned by the FET device or sensor 1, 2, 101, 201 of the present disclosure include the Semiconductor, biochemical sensor industry and all subsequent industrial sectors (e.g. biochemical analysis sector, etc.), as well as Wearable sensors, Lab-on-Chip and Lab-on-Skin applications.

The Inventors have produced a CMOS 3D-Extended Metal Gate ISFETs with Near Nernstian Ion Sensitivity. The Inventors report for the first time, to the best of their knowledge, a post-processed 0.18 μm commercial CMOS chip where the transducing transistor and the sensing gate electrode are vertically co-integrated, resulting in a 3D-Extended Metal Gate ISFET (3D-EMG-ISFET). The top electrode is made of Al with an $Al_2O_3$ native oxide connected to the transistor gate by using vertical vias V. With this approach, a sensitivity of 56.8 mV/pH is achieved. The proposed ISFET of the present disclosure is validated as a full-scale pH sensor and it can be fabricated in a non-modified commercial CMOS process.

Fabrication:

The ISFETs are fabricated by post-processing MOSFET devices designed in a commercial 0.18 μm CMOS chip. The gate 4 of the MOSFET is vertically extended in 3D to the top metal layer through stacks of vias V and metal layers M with $SiO_2$ being used as an inter-metal dielectric (IMD), as shown in the cross section in FIG. 4A.

A 4-inch silicon handle wafer with an etched cavity is fabricated to place the chip (≤2 mm×2 mm) as shown in FIG. 4B. The chip size can, for example, be between 1 mm×1 mm to 50 mm×50 mm. This cavity is made by a photolithography and BOSCH process etch step [4]. Process steps to modify the MOSFET to an ISFET with a 3D integrated metal electrode stack ST, are depicted in FIGS. 5A to 5D. First, openings of the gate area (for example, 8 μm×20 μm) are written using photolithography as shown in FIGS. 5A to 5B. Then, underlying nitride and oxide layers are etched using $He/C_4F_8$ chemistry by reactive ion etching as in FIGS. 5C to 5D. The exposed top metal M (for example, Al) is oxidized to form a thin $Al_2O_3$ which is used as a sensing layer 21.

These post-process steps can easily be replaced by using a PAD mask in the layout design phase, thus making this 3D-EMG-ISFET fabrication an unmodified commercial CMOS process.

Experiments and Results:

The fabricated chip or device is bonded to a PCB with a specific setup for measuring pH in a liquid under test (LUT), FIGS. 5E to 5F. The MOSFET $I_D$-$V_G$ characteristics are reported in FIG. 6A before measuring the LUT, showing a perfect fit with predicative model-based simulations. Measurements of the MOSFET have been carried out both before and after the etching steps, to validate that post processing has negligible impact on the device characteristics. Post-layout simulated level of $I_{off}$ is around 115 fA/μm, which is slightly lower than the measured 225 fA/μm. The subthreshold slope (SS) is 67 mV/dec and 74 mV/dec in simulation and measurement, respectively. In the chip, MOSFETs/3D-EMG-ISFETs are connected to bias lines and readout circuits. MOSFET simulations without these parasitic components show even lower Ioff~20 fA/μm and SS~67 mV/dec.

The $I_D$-$V_{ref}$ characteristics of the 3D-EMG-ISFET for sensing various pH buffers are also shown in FIG. 6A. A commercial Ag/AgCl reference electrode (R.E.) supplies $V_{ref}$. $I_{off}$ is around 450 fA/μm. SS~84 mV/dec. All the characteristics are measured in double sweep and observed hysteresis is very low (<8 mV in the subthreshold region). Compared to the $I_D$-$V_G$ of the MOSFET, the ISFETs of the present disclosure exhibit an offset in threshold voltage. This is due to the capacitive divider including coupling and interface capacitance of the top sensing electrode [3]. A nearly-ideal sensitivity of 56.8 mV/pH is experimentally extracted in weak inversion, FIG. 6B, at a constant $I_D$=10 nA. The sensor's current response has been measured chronoamperometrically in various buffer solutions with pH 4 to pH 7, and results are shown in FIG. 6C. The stability of the 3D-EMG-ISFET has also been studied. The sensor is immersed in a pH 4 buffer, and biased at: $V_{ref}$=0.3 V, $V_D$=0.1 V (drain voltage), $V_S$=0 V (source voltage). Its drain current is continuously monitored for 20 hours. The corresponding result is plotted in FIG. 6D. The corresponding threshold voltage drift ($\Delta V_{th}$) can be calculated with the $I_D$—$V_{ref}$ curve. $\Delta V_{th}$~160 mV.

The Inventors demonstrate the fabrication of a 3D-EMG-ISFET that can be produced with a non-modified commercial CMOS process showing pH sensing capabilities comparable with ad hoc devices. For the first time, this disclosure exploits the top oxidized metal layer M of a standard CMOS process as the sensing interface of an extended gate ISFET. This experimental demonstration can greatly accelerate the sensor system design based on standard CMOS technologies and enhance the robustness of ISFET sensors for IoT and wearable applications, making it simultaneously cost-effective.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments and be given the broadest reasonable interpretation in accordance with the language of the appended claims. The features of any one of the above described embodiments may be included in any other embodiment described herein. When a range value is given, the range value includes the extremity values of the range.

REFERENCES

[1] P. Bergveld, Sens. Act. B, vol. 88, p. 1, (2003).
[2] J. Bausells et al., Sens. Act. B, vol. 57, p. 56, (1999).
[3] P. Georgiou et al., Sens. Act. B, vol. 143, p. 211, (2009).
[4] E. Shahrabi et al., *PRIME conf*, p. 1, (2016).
[5] S. Jamasb, IEEE Sen. J., vol. 4, p795, (2004)
[6] D. J. Foster. Silicon Processing: CMOS Technology. Electronic Materials, pp 173-191

The entire contents of each of the above references are herein incorporated by reference.

The invention claimed is:

1. A Field-Effect Transistor (FET) device configured to sense at least one of ions, molecules and biomarkers in a liquid, the Field-Effect transistor device comprising:
    at least one substrate;
    at least one drain region;
    at least one source region;
    at least one channel region extending between the at least one drain region and the at least one source region;
    at least a first gate connected to the channel region to control a current in the channel region;
    at least one stack comprising at least one layer comprising metal and at least one via layer;
    at least one second gate connected to the at least one first gate by the at least one stack, the at least one second gate permitting sensing of at least one of ions, molecules, and biomarkers;
    at least one microfluidic channel connected to the at least one second gate, the at least one microfluidic channel comprising at least one floor and at least one side wall extending from the at least one floor; and
    at least one superposed layer surrounding the at least one layer comprising metal and the at least one via layer of the at least one stack and surrounding the at least one second gate, the at least one superposed layer extending from the at least one stack and the at least one second gate to form the at least one microfluidic channel,
    the at least one microfluidic channel extending in a plane parallel to a plane defined by the at least one substrate to define a microfluidic channel network to distribute the liquid to different locations on the Field-Effect Transistor (FET) device,
    wherein the at least one microfluidic channel includes at least one entrance aperture to receive the liquid via capillary action, the at least one entrance aperture being in fluid communication with the microfluidic channel network to distribute the liquid through the microfluidic channel network via capillary action, and
    wherein the at least one microfluidic channel includes at least one exit aperture to evacuate the liquid, the at least one exit aperture being in fluid communication with the microfluidic channel network to receive the liquid from the microfluidic channel network and the at least one exit aperture being in fluid communication with the at least one entrance aperture to receive the liquid from the at least one entrance aperture.

2. The FET device according to claim 1, further comprising a sensing material or probe layer, or wherein the at least one second gate defines the sensing material or probe layer.

3. The FET device according to claim 1, further comprising a sensing material or probe layer located on the at least one second gate to render the FET device sensitive to specific biological.

4. The FET device according to claim 3, further including a noble metal between the at least one second gate and the sensing material or probe layer.

5. The FET device according to claim 1, further including a protection material located on the at least one side wall or on at least one outer surface of the at least one microfluidic channel to protect device circuitry.

6. The FET device according to claim 1, further comprising an add-on structure configured to confine the liquid under test in the at least one microfluidic channel.

7. The FET device according to claim 6, wherein the add-on structure and the microfluidic channel are configured to define the microfluidic channel network and distribute the liquid by capillarity or capillary action to different locations on the FET device or on a die comprising the FET device.

8. The FET device according to claim 7, wherein the add-on structure and the microfluidic channel are configured to collect the liquid by capillarity or capillary action from a surface of an external object in proximity to or in contact with the FET device.

9. The FET device according to claim 1, further comprising a reference electrode to set a bias voltage.

10. The FET device according to claim 9, wherein the reference electrode comprises a miniaturized-reference electrode integrated on-chip or on-device, or a miniaturized quasi reference electrode integrated on-chip or on-device.

11. The FET device according to claim 1, further comprising at least one metal layer or metal extension and at least one via layer or via extension defining the at least one side wall of the at least one microfluidic channel.

12. The FET device according to claim 11, further comprising a noble metal located on the at least one side wall, or located between the at least one side wall and a sensing material or probe layer.

13. The FET device according to claim 10, wherein the miniaturized-reference electrode integrated on-chip, or the miniaturized quasi reference electrode integrated on-chip is located on or sitting on top of a passivation layer, an inter-metal dielectric layer, an etched portion of an inter-metal dielectric layer, one of the metal layers, one of the VIA layers, or a contact layer.

14. The FET device according to claim 11, wherein the miniaturized-reference electrode integrated on-chip or on-device, or the miniaturized quasi reference electrode integrated on-chip or on-device is configured to form an electrical contact with a device sensing surface through a conductive liquid present in the at least one microfluidic channel.

15. The FET device according to claim 1, wherein the at least one microfluidic channel is sealed with a sealing material, the at least one microfluidic channel including a plurality of entrance apertures and a plurality of exit apertures.

16. A point-of-care or wearable device including the FET device according to claim 1.

* * * * *